(12) United States Patent
Kottmyer et al.

(10) Patent No.: US 9,190,878 B2
(45) Date of Patent: Nov. 17, 2015

(54) ROTOR INCLUDING ANTI-ROTATION FEATURE FOR MULTI-POLE STRUCTURE

(75) Inventors: Daniel L. Kottmyer, Springfield, OH (US); Robert J. Marks, Huber Heights, OH (US); Manuel António Fernandes Dias, Laundos Povoa de Varzim (PT)

(73) Assignee: Globe Motors, Inc., Dayton, OH (US)

( * ) Notice: Subject to any disclaimer, the term of this patent is extended or adjusted under 35 U.S.C. 154(b) by 721 days.

(21) Appl. No.: 13/422,112

(22) Filed: Mar. 16, 2012

(65) Prior Publication Data
US 2013/0241336 A1 Sep. 19, 2013

(51) Int. Cl.
*H02K 21/14* (2006.01)
*H02K 1/27* (2006.01)

(52) U.S. Cl.
CPC .............. *H02K 1/278* (2013.01); *H02K 1/2773* (2013.01); *H02K 1/2786* (2013.01)

(58) Field of Classification Search
CPC ....... H02K 1/27; H02K 1/278; H02K 1/2773; H02K 1/2786; H02K 1/17
USPC .......................... 310/156.01–156.84, 400–433
See application file for complete search history.

(56) References Cited

U.S. PATENT DOCUMENTS

| | | | |
|---|---|---|---|
| 4,219,752 A | 8/1980 | Katou | |
| 5,040,286 A | 8/1991 | Stark | |
| 5,175,461 A * | 12/1992 | Zigler et al. | 310/156.28 |
| 5,345,669 A | 9/1994 | Zigler et al. | |
| 5,563,463 A * | 10/1996 | Stark | 310/156.28 |
| 5,650,680 A | 7/1997 | Chula | |
| 6,084,330 A | 7/2000 | Fisher et al. | |
| 6,324,745 B1 | 12/2001 | Poag et al. | |
| 7,548,006 B2 * | 6/2009 | Yu | 310/156.12 |
| 7,847,457 B2 | 12/2010 | Achor | |
| 8,482,178 B2 * | 7/2013 | Okitsu et al. | 310/156.27 |
| 2009/0309448 A1 * | 12/2009 | Yang et al. | 310/156.22 |
| 2010/0289367 A1 * | 11/2010 | Lau et al. | 310/156.09 |

FOREIGN PATENT DOCUMENTS

WO 2011108733 A1 9/2011

OTHER PUBLICATIONS

Fernandez, Victor; International Search Report and Written Opinion of the International Searching Authority; PCT/US2013/030666; Jul. 23, 2014; European Patent Office; Rijswijk, the Netherlands.

* cited by examiner

*Primary Examiner* — Hanh Nguyen
*Assistant Examiner* — Leda Pham
(74) *Attorney, Agent, or Firm* — Stevens & Showalter LLP

(57) ABSTRACT

A permanently magnetizable rotor having a central rotor structure including a rotor shaft supporting a cylindrical backiron. The rotor further includes a multi-pole structure comprising circumferentially alternating pole elements, and a rotor cover extending longitudinally over the multi-pole structure. The rotor additionally includes an endcap including an engagement surface positioned in engagement with an end of the backiron. The endcap defines first and second anti-rotation features for preventing circumferential rotation of one or more of the pole elements about the backiron. The first anti-rotation feature is configured differently than the second anti-rotation feature and each anti-rotation feature defines a torque transmitting feature for transmitting a torque from different locations on the multi-pole structure.

17 Claims, 4 Drawing Sheets

ROTOR INCLUDING ANTI-ROTATION FEATURE FOR MULTI-POLE STRUCTURE

FIELD OF THE INVENTION

The present invention relates to electric motors and, more particularly, to a rotor for a motor including one or more features for maintaining a position of a magnet structure on the rotor.

BACKGROUND OF THE INVENTION

Electric motors including rotors comprising permanent magnets, such as brushless DC motors, commonly include a rotor core or backiron supporting a plurality of separately formed magnets. In a known construction of the rotors, the magnets are adhesively retained to the backiron in the axial, radial and circumferential directions, where the adhesive may be the only means of retaining the magnets to the backiron. The magnets may be surrounded by a magnet rotor cover that fits tightly over an outer surface of the magnets and that operates as a secondary means of retaining the magnets in the axial and radial directions, but does not prevent movement of the magnets in the circumferential direction. For example, the rotor cover may extend longitudinally over the magnets and be formed over the axial ends of the magnets to provide a radial and axial retention of the magnets. Additionally, an endcap may be located to cover the ends of the magnets to prevent damage to the material forming the magnets along the edges where the rotor cover is formed over the axial ends. However, the rotor cover and endcap do not provide a positive retention mechanism for retaining the magnets in a circumferential direction to prevent the magnets from rotating around the backiron in the event of failure of the adhesive.

The magnets may also be located at predetermined circumferential locations by various features. For example, the backiron may be formed with small tabs located between adjacent magnets and thus prevent rotation of the magnets around the backiron if the adhesive should fail. However, the use of such features affects the manufacturing process, the resulting motor performance, and the complexity of the backiron design. One or more of the features described above are disclosed in U.S. Pat. No. 5,563,463, which patent is incorporated herein by reference.

SUMMARY OF THE INVENTION

In accordance with an aspect of the invention, a permanently magnetizable rotor is provided having a central rotor structure including a rotor shaft supporting a cylindrical backiron, the rotor further including a multi-pole structure comprising circumferentially alternating pole elements, and a rotor cover extending longitudinally over the multi-pole structure. The rotor further comprises an endcap including an engagement surface positioned in engagement with an end of the backiron. The endcap defines first and second anti-rotation features for preventing circumferential rotation of one or more of the pole elements about the backiron. The first anti-rotation feature is configured differently than the second anti-rotation feature and each anti-rotation feature defines a torque transmitting feature for transmitting a torque from different locations on the multi-pole structure.

In accordance with further aspects of the invention the endcap may include a peripheral surface, and the first anti-rotation feature may comprise discrete indentations extending into the peripheral surface and engaged by corresponding discrete portions of an end of the rotor cover that extend in a radial direction inwardly past the peripheral surface of the endcap. The rotor cover may comprise a thin metal member that is formed into the discrete indentations of the first anti-rotation feature and which may be further formed to conform around radially extending contours on the multi-pole structure.

In accordance with other aspects of the invention, the second anti-rotation feature may comprise tabs that extend axially from the engagement surface of the endcap and engage in spaces defined in at least an end portion of the multi-pole structure. The tabs may have a radially facing outer surface, and the outer surface may be located aligned with a circumferential outer edge of the endcap. The tabs may define a triangular cross-section, including two sides that taper toward each other in a radially inward direction toward a center of the endcap. The multi-pole structure may have a length dimension in the axial direction, and the tabs may have a length in the axial direction that is less than the length of the multi-pole structure.

The rotor may further include an interengagement structure that may comprise an element of the endcap having a predetermined shape and a cooperating element on the central rotor structure having a complementary shape preventing relative rotation between the endcap and the central rotor structure, and wherein: the endcap may include a peripheral surface, and the first anti-rotation feature may comprise discrete indentations extending into the peripheral surface and engaged by corresponding discrete portions of an end of the rotor cover that extend in a radial direction inwardly past the peripheral surface of the endcap; and the second anti-rotation feature may comprise tabs that extend axially from the engagement surface of the endcap and that may engage in spaces defined in at least an end portion of the multi-pole structure. The pole elements may comprise separate elements, each pole element including a radially inner side that is adhesively affixed to the backiron. Additionally, the interengagement structure may comprise endcap posts extending from the engagement surface into the backiron and preventing relative rotation between the endcap and the backiron.

In accordance with another aspect of the invention, a permanently magnetizable rotor is provided having a central rotor structure including a rotor shaft supporting a cylindrical backiron, the rotor further including a multi-pole structure comprising circumferentially alternating pole elements and spaces that extend generally longitudinally between adjacent pole elements, and a rotor cover extending longitudinally over the multi-pole structure. The rotor further comprises an endcap including an engagement surface positioned in engagement with an end of the backiron, and a peripheral surface located at a circumferential edge of the endcap. An interengagement structure is provided comprising an element of the endcap having a predetermined shape and a cooperating element on the central rotor structure having a complementary shape preventing relative rotation between the endcap and the central rotor structure. An anti-rotation feature is provided for preventing circumferential rotation of one or more of the pole elements about the backiron. The anti-rotation feature comprises discrete indentations extending into the peripheral surface and engaged by corresponding discrete portions of an end of the rotor cover that extend in a radial direction inwardly past a peripheral surface of the endcap for transmitting a torque from a location of the spaces between adjacent pole elements to circumferential locations along the circumference of the endcap.

In accordance with additional aspects of the invention, the rotor cover may comprise a thin metal member that is formed into the discrete indentations of the anti-rotation feature. The pole elements may each include a pair of longitudinally extending edges, wherein the spaces may be defined between longitudinal edges of adjacent pole elements, and the rotor cover may be further formed into at least a portion of the spaces between the longitudinal edges of the pole elements. An additional anti-rotation feature may be provided comprising tabs that extend axially from the engagement surface of the endcap and engage in the spaces between adjacent pole elements.

In accordance with another aspect of the invention, a permanently magnetizable rotor is provided having a central rotor structure including a rotor shaft supporting a cylindrical backiron, the rotor further including a multi-pole structure comprising circumferentially alternating pole elements. The rotor further comprises an endcap including an engagement surface positioned in engagement with an end of the backiron. An interengagement structure is provided comprising an element of the endcap having a predetermined shape and a cooperating element on the central rotor structure having a complementary shape preventing relative rotation between the endcap and the central rotor structure. An anti-rotation feature is provided for preventing circumferential rotation of one or more of the pole elements about the backiron. The anti-rotation feature comprises tabs that extend axially from the engagement surface of the endcap and engage in spaces defined in at least an end portion of the multi-pole structure for transmitting a torque from a location on a longitudinal end of the multi-pole structure to circumferential locations along the circumference of the endcap.

In accordance with further aspects of the invention, the tabs may have a radially facing outer surface, and the outer surface may be located aligned with a circumferential outer edge of the endcap. The tabs may define a triangular cross-section, including two sides that taper toward each other in a radially inward direction toward a center of the endcap. The multi-pole structure may have a length dimension in the axial direction, and the tabs may have a length in the axial direction that is less than the length of the multi-pole structure.

Additionally, the rotor may further include a rotor cover extending longitudinally over the multi-pole structure and engaging in spaces between adjacent pole elements. An additional anti-rotation feature may be provided comprising discrete indentations that may extend into a peripheral surface of the endcap and may be engaged by corresponding discrete portions of an end of the rotor cover that extend in a radial direction inwardly past a peripheral surface of the endcap.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

In accordance with aspects of the invention, a rotor is provided for use in a motor including, but not necessarily limited to, a brushless DC motor in which a circumferentially extending multi-pole structure providing pole elements is maintained at a predetermined circumferential position relative to a central rotor structure for the rotor. As may be understood from the following description, aspects of the invention provide plural distinct anti-rotation coupling paths between the central rotor structure and the multi-pole structure. Also, although the following discussion is presented with reference to particular structure for illustration of the principles characterizing the invention such as, for example, a multi-pole structure comprising a plurality of separate pole elements, other configurations of such structure may be implemented within the spirit and scope of the invention, including a unitary multi-pole structure configured with a contoured structure for operating with the anti-rotation coupling structure described below.

Figure 1:
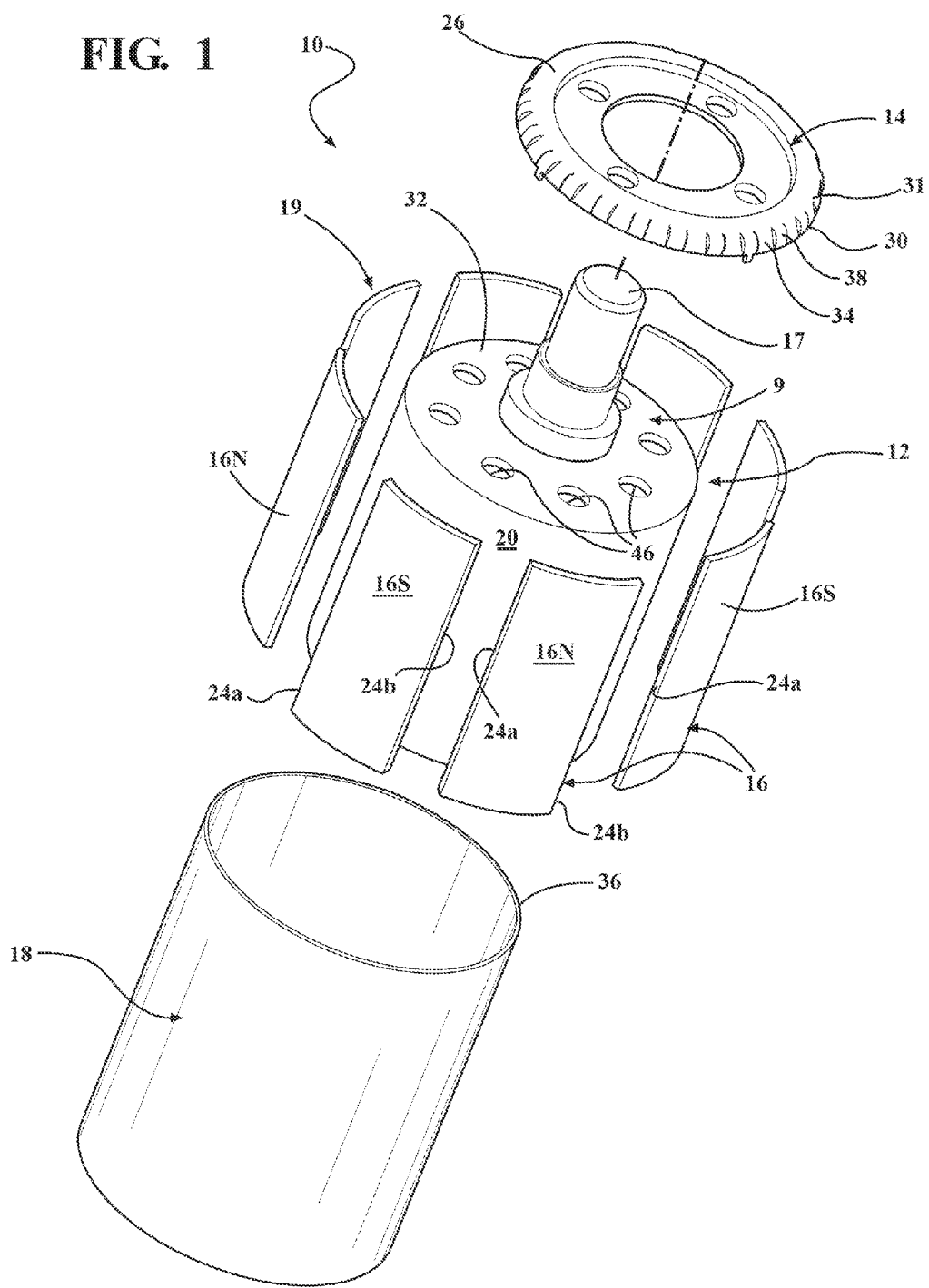
FIG. 1 is an exploded perspective view of a motor rotor assembly in accordance with aspects of the invention.
Figure 6:
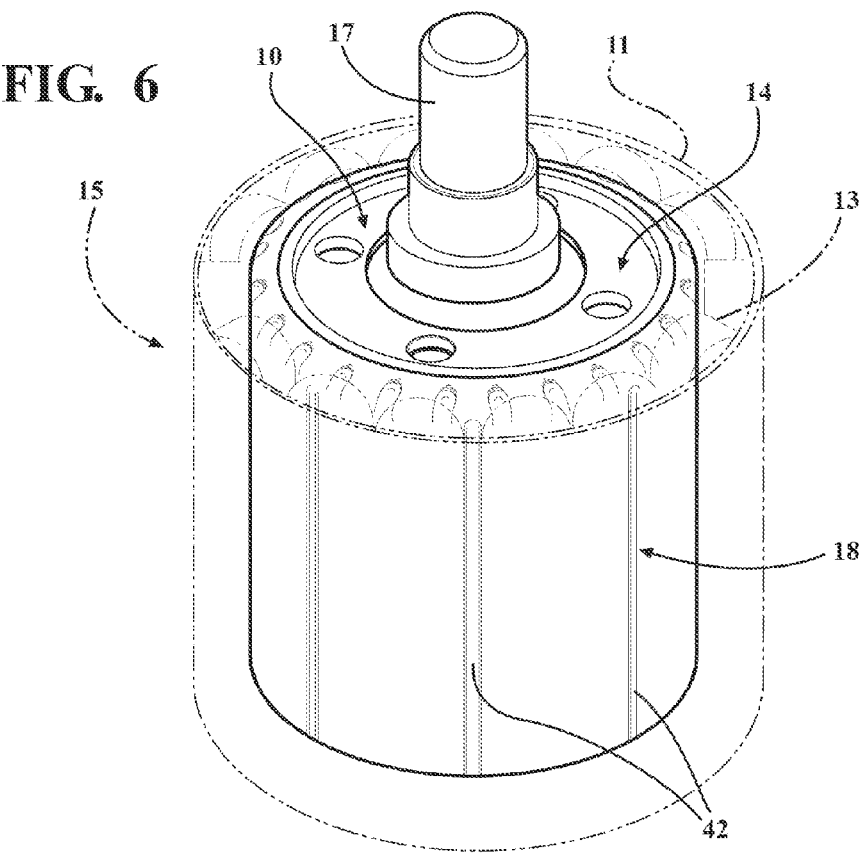
FIG. 6 is a perspective view illustrating the rotor in relation to a diagrammatically represented stator for a motor.

Referring to FIGS. 1 and 6, a permanently magnetizable rotor constructed in accordance with aspects of the present invention is indicated generally at 10, presented as a non-limiting representation of the invention. As is particularly depicted in FIG. 6, the rotor 10 may be configured for use in a dynamoelectric machine, such as in a brushless DC motor 15 which is partially diagrammatically illustrated as having a stator 11 supporting a plurality of field coils 13. The stator 11 includes a central passage for receiving the rotor 10 to be rotatably driven relative to the stator 11 by a magnetic field produced in the stator coils 13.

As seen in FIG. 1, the rotor 10 comprises a central rotor structure 9 including a backiron 12 and a rotor shaft 17 extending through and rigidly attached to the backiron 12 for supporting the rotor 10 for rotation. The rotor 10 further includes at least one endcap 14 supported on the backiron 12, and a multi-pole structure 19, depicted herein as comprising a plurality of separately formed arcuate shaped magnetizable pole elements 16. The rotor 10 further includes an outer rotor cover 18 that extends circumferentially around and longitudinally over the magnetizable pole elements 16, and engages against the magnetizable pole elements 16 to facilitate retention of the pole elements 16 to the backiron 12 in at least one direction, as will be described further below.

The backiron 12 may be formed in any known or conventional manner. For example, in one embodiment, the backiron 12 may be formed of a plurality of laminations bonded together to form a cylindrical structure. Alternatively, the backiron 12 may comprise a solid metallic core, such as a sintered iron or machined core.

Figure 4:
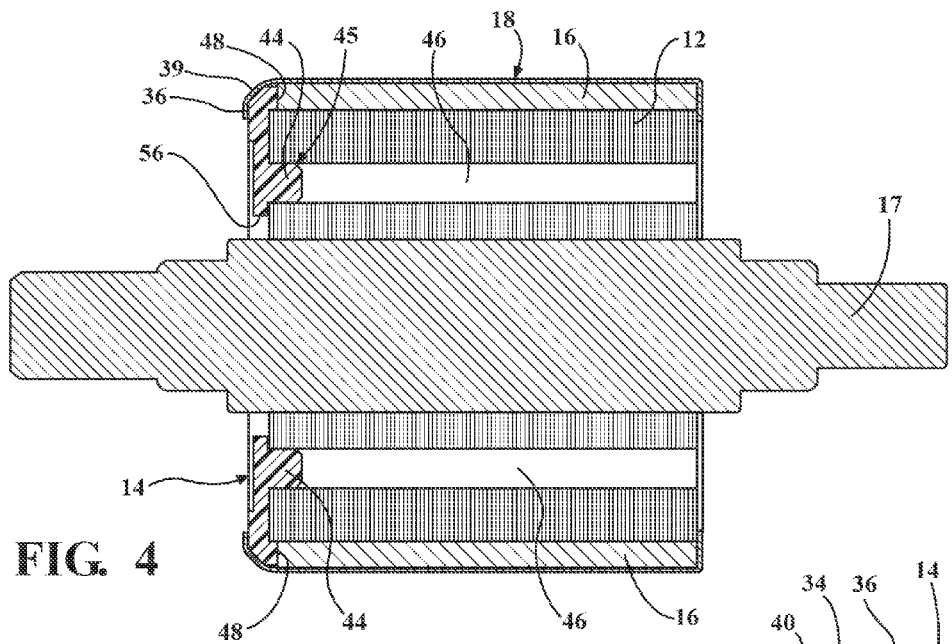
FIG. 4 is a cross-sectional view of the rotor.

The rotor cover 18 may be formed as a relatively thin structure, and may be formed of aluminum. The rotor cover 18 is preferably configured to be readily formed on the rotor 10, as seen in FIG. 4, while also having sufficient thickness to retain its shape during use of the rotor 10 in a dynamoelectric machine such as the motor 15 (FIG. 6). For example, the rotor cover 18 may be formed onto the rotor 10 in a magneforming process and may be constructed of a sheet metal material that may facilitate such a process, such as sheet aluminum having a thickness in a range of about 0.2 mm to about 0.3 mm. It may be understood that, to the extent that the rotor cover 18 may be configured as described further below, the rotor cover 18 may be formed of other materials and with other dimensions than specifically described herein. Additionally, it is contemplated that the forming operation described in accordance with aspects of the invention may entirely or at least partially comprise a mechanical pressing operation.

Figure 3:
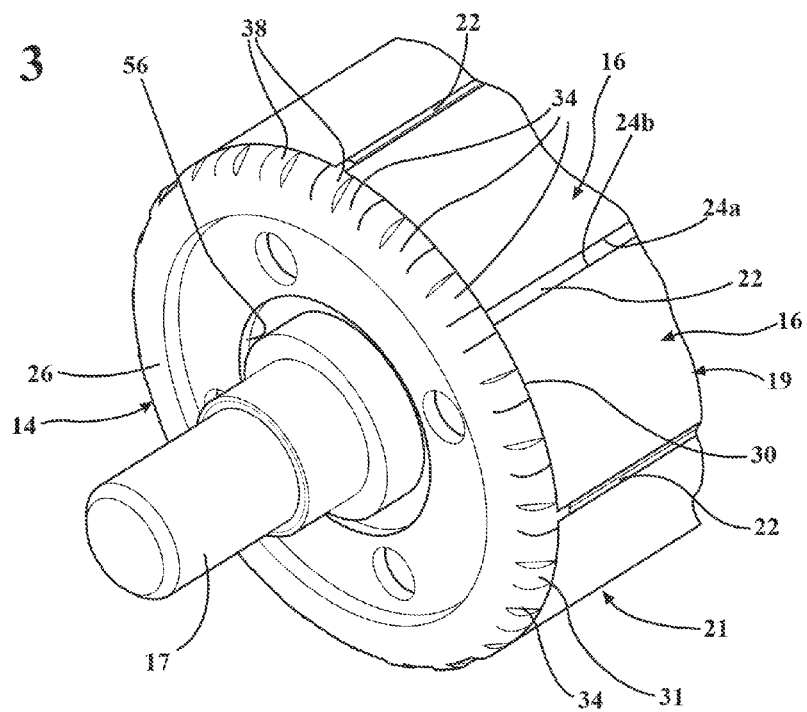
FIG. 3 is a perspective view of a partially assembled rotor illustrating aspects of the invention.

In FIG. 1, the multi-pole structure 19 formed by the magnetizable pole elements 16 is depicted by eight pole elements 16, which may comprise, for example, a rare earth magnetizable material, as is known in the art. The pole elements 16 of the illustrated embodiment comprise elements of alternating poles 16N, 16S that may be adhesively attached to an outer surface 20 of the backiron 12, and may be affixed to the backiron 12 by a thermally activated adhesive to form a backiron and magnet assembly 21 (FIG. 3). As depicted herein, the pole elements 16 are sized and located in a circumferential direction around the backiron 12 such that a predetermined gap or space 22 is defined between longitudinal edges 24a, 24b (FIG. 1) of adjacent pole elements 16, as may be seen in FIG. 3. The depth of the gap 22 is substantially equal to or defined by the thickness of the pole elements 16.

In accordance with additional aspects of the invention, the multi-pole structure 19 may comprise a unitary cylindrical structure (not shown) that may be positioned around and adhered to or pressed around the backiron 12. The unitary multi-pole structure may comprise discretely magnetized pole elements located with alternating poles around the circumference of the backiron 12, wherein longitudinal grooves or gaps of a predetermined depth may be defined in the surface of the multi-pole structure, such as at boundaries between the alternating poles. Alternatively, other surface features may be formed in the multi-pole structure for cooperating with the rotor cover 18 in a forming operation, as is described further below.

Figure 2:
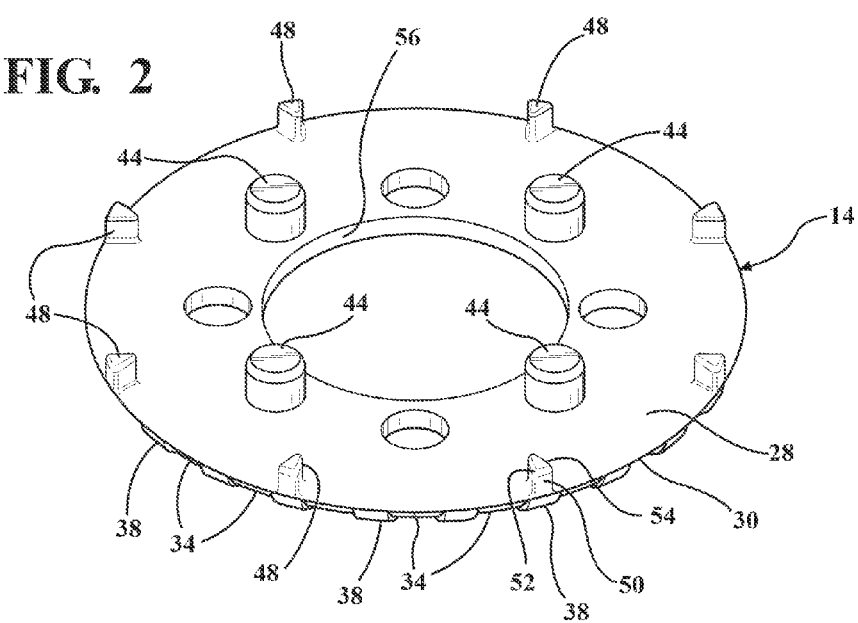
FIG. 2 is a rotor endcap illustrating aspects of the invention.

Referring to FIGS. 1 and 2, the endcap 14 is a substantially planar or disk-shaped member having a first or outer surface 26, a second or engagement surface 28, and a circumferential edge 30 defining a peripheral surface 31 (FIGS. 1 and 3) between the outer and engagement surfaces 26, 28. The peripheral surface 31 may be formed with a radius, and the peripheral surface 31 is angled radially inwardly, extending from the engagement surface 28 toward the outer surface 26. The endcap 14 may be formed of any material that may be readily formed into the configuration described herein. For example, the endcap 14 may be formed of a cast or molded alloy or resin material.

The endcap 14 is positioned on an end surface 32 of the backiron 12 that may be defined by an outer lamination of the backiron 12, with the engagement surface 28 in engagement with the end surface 32. In accordance with an aspect of the invention, the endcap 14 includes first and second anti-rotation features for preventing circumferential rotation of one or more of the pole elements 16 relative to the backiron 12. Either of the anti-rotation features, as described below, may be considered a primary anti-rotation feature, and may be used independently of the other anti-rotation feature. However, for purposes of the present description, a first anti-rotation feature comprises discrete indentations 34 formed in the peripheral surface 31, as may be seen in FIG. 3. The discrete indentations 34 alternate with non-indented portions 38 defining the peripheral surface 31 at the circumferential edge 30. It may be understood that reference to the indentations 34, as used herein, refers to features on the endcap 14 that define a contour into or out of the surface of the endcap 14, i.e., a surface defined by the outer surface 26 and/or the peripheral surface 31, that the rotor cover 18 may form or deform into or around, such as is described further below.

Figure 5A:
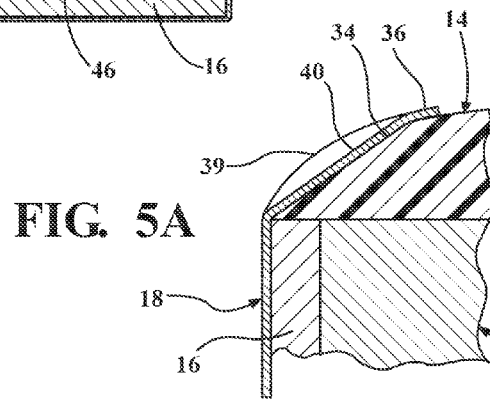
FIG. 5A is a cross-sectional view taken along line 5A-5A in FIG. 5 illustrating a portion of a rotor cover formed into a discrete indentation of an endcap.
Figure 5:
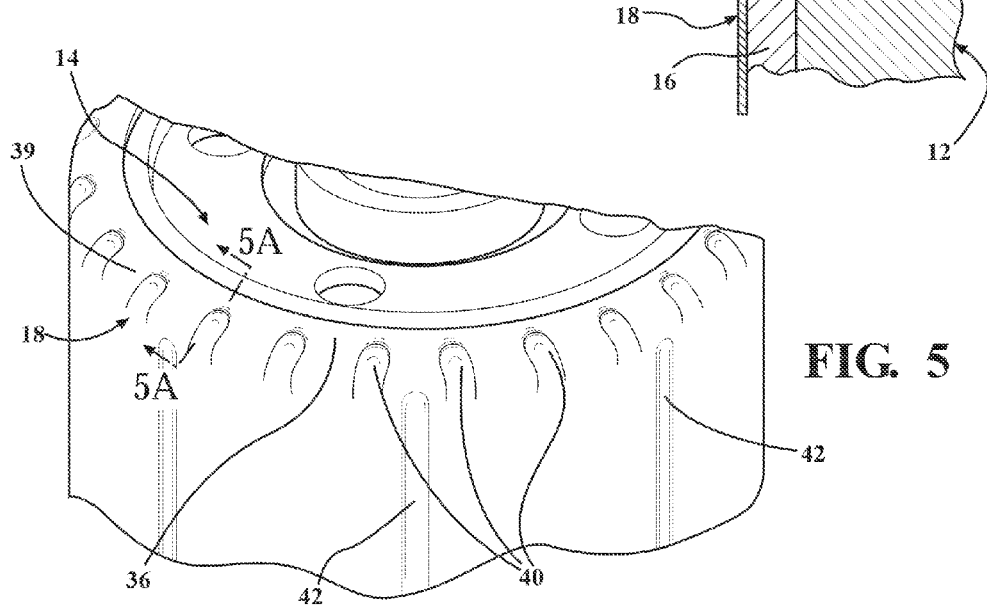
FIG. 5 is a perspective view illustrating an end portion of the rotor.

The rotor cover 18 is formed with a length sufficient for the end 36 of the rotor cover 18 adjacent to the endcap 14 to extend to an axial location about equal to or a short axial distance past the outer surface 26 of the endcap 14, such that a metal forming process, e.g., a magneforming process, applied to the rotor cover 18 causes the end 36 to deform radially inwardly, depicted as inwardly formed surface 39 in FIG. 5, and extend over the circumferential edge 30 and peripheral surface 31. Additionally, the forming operation causes discrete portions 40 (see FIG. 5) of the end 36 to extend in the radial direction inwardly relative to the inwardly formed surface 39 past the radially outer portions of the peripheral surface 31 and into corresponding ones of the indentations 34.

Optionally, when a magneforming operation is performed, the magneforming operation may be followed by a secondary roll forming operation to ensure that the rotor cover 18 is in direct or intimate contact with the circumferential edge 30, peripheral surface 31 and discrete indentations 34. The secondary roll forming operation may additionally ensure that the final axial length of the rotor 10 is within allowed tolerance constraints.

The rotor cover 18 is further formed to conform around radially extending contours on the multi-pole structure 19. In the illustrated embodiment, the rotor cover 18 may be deformed to conform to the multi-pole structure 19 along discrete longitudinally extending portions 42 of the rotor cover 18 at locations aligned between adjacent pole elements 16. Specifically, the longitudinal portions 42 may be formed by a forming process, such as a magneforming process, causing the rotor cover 18 to extend into at least a portion of the spaces 22 formed between the longitudinal edges 24a, 24b of adjacent pole elements 16. Alternatively, and more generally, the multi-pole structure may include any type of contour, typically a radially extending contour at or adjacent to an outer surface of the multi-pole structure 19, that the rotor cover 18 may be formed around to create a non-slipping contact between the rotor cover 18 and the multi-pole structure 19.

Hence, the metal forming operation forms a first non-rotatable connection between the multi-pole structure 19, e.g. the pole elements 16, and the endcap 14. In particular, the engagement of the end 36 of the rotor cover 18 and the contoured portion defined by the indentations 34 of the endcap 14 forms an anti-rotation connection between the endcap 14 and the rotor cover 18. Also, the engagement of the longitudinal portions 42 and the contour of the multi-pole structure 19, such as is provided by the engagement of the portions 42 extending at least part way into the spaces 22 between the pole elements 16 creating an associated immovable engagement of the longitudinal portions 42 against the longitudinal edges 24a, 24b, forms an anti-rotation connection between the pole elements 16 and the rotor cover 18.

Referring to FIG. 4, the endcap 14 includes an interengagement structure 45 comprising an element of the endcap 14 having a predetermined shape and a cooperating element on the central rotor structure 9 having a complementary shape preventing relative rotation between the endcap 14 and the central rotor structure 9.

In accordance with an aspect of the invention, the interengagement structure 45 may comprise interengagement features defined by endcap posts 44 (see also FIG. 2), extending axially from the engagement surface 28. In the illustrated embodiment, four endcap posts 44 having a cylindrical cross-sectional shape are shown. However, the posts 44 may have other shapes. The endcap posts 44 extend into complementary shaped longitudinally extending passages 46 formed in the backiron 12, as may be seen in FIG. 4. The interengagement of the posts 44 with the passages 46 prevents rotation of the endcap 14 relative to backiron 12, and more generally relative to the central rotor structure 9 as a whole, thereby linking the multi-pole structure 19 to the backiron 12 via the rotor cover 18 and the endcap 14.

Figure 7:
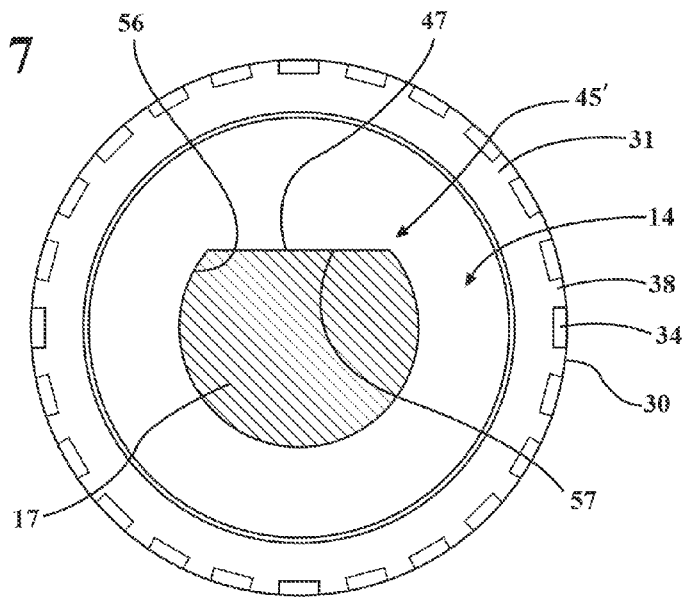
FIG. 7 is a partial cross-sectional plan view illustrating a further aspect of the invention.

Referring to FIG. 7, a further aspect of the invention is illustrated comprising an alternative interengagement structure 45', wherein the alternative interengagement structure 45' comprises a shape of a central aperture 56 of the endcap 14 for receiving or cooperating with a portion of the central rotor structure 9 comprising a portion of the rotor shaft 17 having a complementary shape. In particular, the rotor shaft 17 may be formed with a flat 47 for cooperating with a complementary flat 57 portion of the endcap aperture 56 for preventing relative rotation between the endcap 14 and the rotor shaft 17 and associated backiron 12.

Referring to FIG. 2, a second anti-rotation feature comprises a plurality of tabs 48 that extend axially from the engagement surface 28 of the endcap 14. The tabs 48 are configured to engage within spaces defined in at least the end portion of the multi-pole structure 19 adjacent to the end surface 32 of the backiron 12. In the particular embodiment illustrated herein, the tabs 48 may each be configured to engage in the spaces 22 between the opposing longitudinal edges 24a, 24b of adjacent pole elements 16 when the endcap 14 is positioned on the end surface 32. For example, the tabs 48 may have a generally triangular shape, as viewed from the end of a tab 48 in an axial direction, each tab 48 including a radially facing outer surface 50 aligned with the circumferential edge 30 of the endcap 14, and two sides 52, 54 that taper toward each other extending radially from the outer surface 50 toward the center of the endcap 14. The two sides 52, 54 of each tab 48 are preferably oriented parallel to the longitudinal edges 24a, 24b in both the radial and longitudinal directions.

The tabs 48 may be formed with any axial length that is functional to provide an engagement structure between the multi-pole structure 19 and the endcap 14. For example, it is contemplated that the length of the tabs 48 may preferably be equal to or less than an axial length of the multi-pole structure 19. Within the scope of the invention, the tabs 48 could also be formed longer than the axial length of the multi-pole structure 19. In accordance with an aspect of the invention, the tabs 48 may be relatively short structures, such as may be desirable for minimizing material requirements for the endcap 14. In the specific non-limiting embodiment illustrated herein, the tabs 48 have a length dimension that is approximately equal to a width of a tab 48, such as a width measured in the circumferential direction along the outer surface 50. However, it should be understood that the tabs 48 may have width and length dimensions that are unrelated to each other, and the particular configuration of the tabs 48 is selected to perform the anti-rotation function described herein and to accommodate any manufacturing and assembly limitations that may exist. For example, the width is determined by the available space between the elements 16, such as to position the opposing sides 52, 54 close to the respective longitudinal edges 24a, 24b. The length of the tabs 48 may be selected to ensure that the tabs 48 remain in engagement with the elements 16 under all component and assembly tolerance conditions. Further, the length selected for the tabs 48 may be limited by one or more conditions such as, for example, manufacturing limitations, susceptibility of the tabs 48 to damage prior to assembly into the rotor 10 and/or where additional length of the tabs 48 does not provide appreciable additional retention strength.

The engagement of the tabs 48 with the multi-pole structure 19, as depicted by engagement of the tabs 48 with the longitudinal edges 24a, 24b of the pole elements 16, forms an anti-rotation connection between the pole elements 16 and the endcap 14. Also, as described above, an interengagement structure, such as is depicted by the interengagement structures 45 and 45' in FIGS. 4 and 7, may be provided to maintain the endcap 14 stationary relative to the central rotor structure 9. Hence, the second anti-rotation feature comprises the endcap 14 preventing rotation of the pole elements 16 relative to the backiron 12 via engagement of the tabs 48 with elements 16.

It may be understood that alternative structure forming spaces at the end surface of the multi-pole structure 19 may be provided for engagement by the tabs 48. For example, and without limitation, the multi-pole structure 19 may be formed with a castellated end wherein the tabs 48 may be engaged between castellations to prevent relative rotation between the endcap 14 and the multi-pole structure 19. Such a multi-pole structure 19 could be formed, for example, as a unitary cylindrical member having spaces at an end thereof, such as may be defined by castellations at an end adjacent to the endcap 14.

As described above, the endcap 14 provides two anti-rotation mechanisms to ensure that the multi-pole structure 19 remains in position relative to the backiron 12. In particular, the pole elements 16 may be maintained in a predetermined circumferential position in the event, for example, that an adhesive holding one or more of the pole elements 16 should fail. It may be noted that each of the above-described anti-rotation mechanisms provides a sufficiently strong connection to individually prevent rotation between the central rotor structure 9 and the multi-pole structure 19, for rotation forces due to the magnetic field strength produced in the motor 15 and those forces resulting from rapid decelerations or accelerations of the rotor 10. However, provision of multiple anti-rotation mechanisms ensures that a substantially fail-safe connection is formed to prevent slippage between the central rotor structure 9 and the multi-pole structure 19.

In addition, the endcap 14 performs conventional endcap functions of providing a structure for protecting the ends of the pole elements 16 where the rotor cover 18 is formed around the end of the backiron 12. The endcap 14 further functions to retain any loose fragments or debris from the pole elements 16 that may be created during operation of a motor 15 incorporating the rotor 10. In accordance with this aspect, it may be noted that the endcap 14 extends a substantial radial distance inwardly toward the rotor shaft 17, thereby forming a containment structure or enclosure substantially surrounding the end of the rotor 10 for preventing fragments or debris from being released into the motor. In particular, when the endcap 14 is in intimate contact with the end of the backiron 12 and the end 36 of the rotor cover 18 is formed over the endcap 14, the rotor cover 18 and endcap 14 contain any magnet debris or other fragments on the endcap end of the rotor 10. Further, the radial extent of the endcap 14 over the end surface 32 of the rotor 10 is sufficient for the endcap 14 to cover holes formed through the backiron 12, including the passages 46 receiving the endcap posts 44 and additional holes or passages formed through the backiron 12, thereby containing any debris that might be present in the holes or passages at the endcap end of the rotor 10. The end of the rotor cover 18 opposite from the end 36 may be formed to extend around and across the ends of the magnetizable elements 16, and extend across a portion of the backiron 12, to contain debris such as magnet fragments that may potentially be present at this end of the rotor 10.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A permanently magnetizable rotor having a central rotor structure including a rotor shaft supporting a cylindrical backiron, the rotor further including a multi-pole structure comprising circumferentially alternating pole elements, and a rotor cover extending longitudinally over the multi-pole structure, the rotor further comprising:
   an endcap including an engagement surface positioned in engagement with an end of the backiron, the endcap defining first and second anti-rotation features for preventing circumferential rotation of one or more of the pole elements about the backiron;
   wherein the first anti-rotation feature is configured differently than the second anti-rotation feature and each anti-rotation feature defines a torque transmitting feature for transmitting a torque from different locations on the multi-pole structure; and
   wherein the endcap includes a peripheral surface, and the first anti-rotation feature comprises discrete indentations extending into the peripheral surface alternating circumferentially along the peripheral surface with non-indented portions, and engaged by a plurality of circumferentially spaced corresponding discrete portions of an end of the rotor cover that extend in a radial direction inwardly past the non-indented portions of the peripheral surface of the endcap.

2. The rotor of claim 1, wherein the rotor cover comprises a thin metal member that is formed into the discrete indentations of the first anti-rotation feature and is further formed to conform around radially extending contours on the multi-pole structure.

3. The rotor of claim 1, wherein the second anti-rotation feature comprises tabs that extend axially from the engagement surface of the endcap and engage in spaces defined in at least an end portion of the multi-pole structure.

4. The rotor of claim 3, wherein the tabs have a radially facing outer surface, and the outer surface is located aligned with a circumferential outer edge of the endcap.

5. The rotor of claim 4, wherein the tabs define a triangular cross-section, including two sides that taper toward each other in a radially inward direction toward a center of the endcap.

6. The rotor of claim 4, wherein the multi-pole structure has a length dimension in the axial direction, and the tabs have a length in the axial direction that is less than the length of the multi-pole structure.

7. The rotor of claim 1, including an interengagement structure comprising an element of the endcap having a predetermined shape and a cooperating element on the central rotor structure having a complementary shape preventing relative rotation between the endcap and the central rotor structure, and wherein:
   the second anti-rotation feature comprises tabs that extend axially from the engagement surface of the endcap and engage in spaces defined in at least an end portion of the multi-pole structure.

8. The rotor of claim 7, wherein the pole elements comprise separate elements, each pole element including a radially inner side that is adhesively affixed to the backiron.

9. The rotor of claim 7, wherein the interengagement structure comprises endcap posts extending from the engagement surface into the backiron and preventing relative rotation between the endcap and the backiron.

10. A permanently magnetizable rotor having a central rotor structure including a rotor shaft supporting a cylindrical backiron, the rotor further including a multi-pole structure comprising circumferentially alternating pole elements and spaces that extend generally longitudinally between adjacent pole elements, and a rotor cover extending longitudinally over the multi-pole structure, the rotor further comprising:
    an endcap including:
       an engagement surface positioned in engagement with an end of the backiron;
       a peripheral surface located at a circumferential edge of the endcap;
       an interengagement structure comprising an element of the endcap having a predetermined shape and a cooperating element on the central rotor structure having a complementary shape preventing relative rotation between the endcap and the central rotor structure; and
       an anti-rotation feature for preventing circumferential rotation of one or more of the pole elements about the backiron, the anti-rotation feature comprising discrete indentations extending into the peripheral surface alternating circumferentially along the peripheral surface with non-indented portions, and engaged by a plurality of circumferentially spaced corresponding discrete portions of an end of the rotor cover that extend in a radial direction inwardly past the non-indented portions of the peripheral surface of the endcap for transmitting a torque from a location of the spaces between adjacent pole elements to circumferential locations along the circumference of the endcap.

11. The rotor of claim 10, wherein the rotor cover comprises a thin metal member that is formed into the discrete indentations of the anti-rotation feature.

12. The rotor of claim 11, wherein the pole elements each include a pair of longitudinally extending edges, wherein the spaces are defined between longitudinal edges of adjacent pole elements, and the rotor cover is further formed into at least a portion of the spaces between the longitudinal edges of the pole elements.

13. The rotor of claim 10, including an additional anti-rotation feature comprising tabs that extend axially from the engagement surface of the endcap and engage in the spaces between adjacent pole elements.

14. A permanently magnetizable rotor having a central rotor structure including a rotor shaft supporting a cylindrical backiron, the rotor further including a multi-pole structure comprising circumferentially alternating pole elements, the rotor further comprising:
    an endcap including:
       an engagement surface positioned in engagement with an end of the backiron;
       an interengagement structure comprising an element of the endcap having a predetermined shape and a cooperating element on the central rotor structure having a complementary shape preventing relative rotation between the endcap and the central rotor structure;

an anti-rotation feature for preventing circumferential rotation of one or more of the pole elements about the back-iron, the anti-rotation feature comprising tabs that extend axially from the engagement surface of the endcap and engage in spaces defined in at least an end portion of the multi-pole structure for transmitting a torque from a location on a longitudinal end of the multi-pole structure to circumferential locations along the circumference of the endcap;

a rotor cover extending longitudinally over the multi-pole structure and engaging in spaces between adjacent pole elements; and an additional anti-rotation feature comprising discrete indentations extending into a peripheral surface of the endcap alternating circumferentially along the peripheral surface with non-indented portions, and engaged by a plurality of circumferentially spaced corresponding discrete portions of an end of the rotor cover that extend in a radial direction inwardly past the non-indented portions of the peripheral surface of the endcap.

15. The rotor of claim 14, wherein the tabs have a radially facing outer surface, and the outer surface is located aligned with a circumferential outer edge of the endcap.

16. The rotor of claim 14, wherein the tabs define a triangular cross-section, including two sides that taper toward each other in a radially inward direction toward a center of the endcap.

17. The rotor of claim 14, wherein the multi-pole structure has a length dimension in the axial direction, and the tabs have a length in the axial direction that is less than the length of the multi-pole structure.

\* \* \* \* \*